United States Patent [19]
Chabanel

[11] 4,168,511
[45] Sep. 18, 1979

[54] COMMON AMPLIFICATION SYSTEM FOR VIDEO AND AUDIO FREQUENCY SIGNALS

[75] Inventor: Pierre Chabanel, Paris, France

[73] Assignee: Thomson-CSF, Paris, France

[21] Appl. No.: 908,853

[22] Filed: May 23, 1978

[30] Foreign Application Priority Data

May 27, 1977 [FR] France ................................. 77 16336

[51] Int. Cl.² .............................................. H04N 5/40
[52] U.S. Cl. ..................................... 358/184; 358/186
[58] Field of Search ................. 358/186, 86, 143, 144, 358/187, 198, 184, 23; 325/156–158, 47, 139; 332/17, 41, 21

[56] References Cited
U.S. PATENT DOCUMENTS

| | | | |
|---|---|---|---|
| 2,901,599 | 8/1959 | Leyton | 358/186 |
| 3,659,041 | 4/1972 | Kitaoka et al. | 358/144 |

*Primary Examiner*—John C. Martin
*Attorney, Agent, or Firm*—Cushman, Darby & Cushman

[57] ABSTRACT

Common amplification system for video and audio frequency signals comprising a coupling device for compensating the non-linearity of a single-channel T.V. transmitter power stages, enabling the single-channel configuration to be limited to the final power stage of which the common use is the only one of economic interest, the other elements of the amplification chain being separate and, as a result, being able to be used at full output.

6 Claims, 3 Drawing Figures

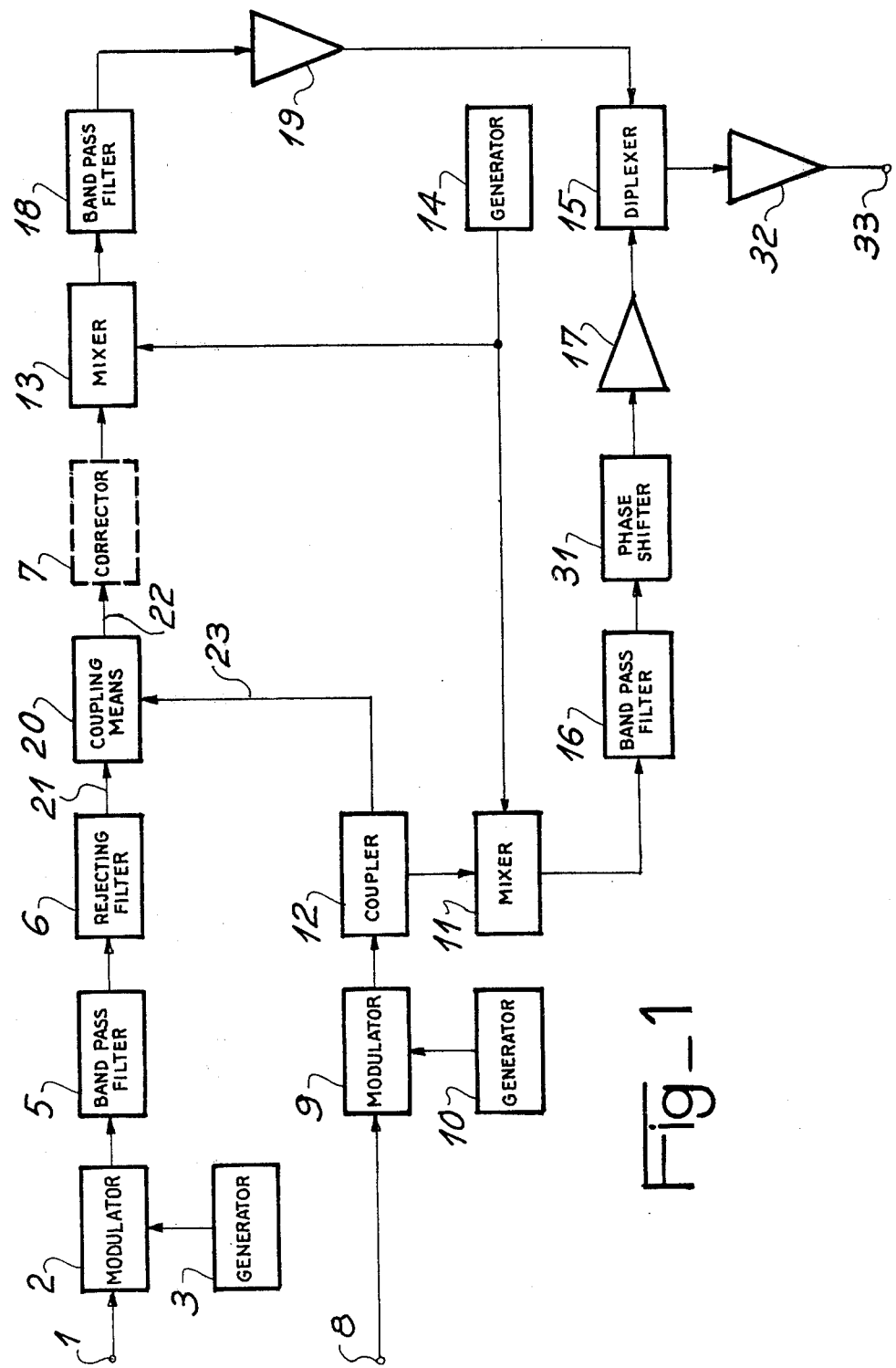
Fig_1

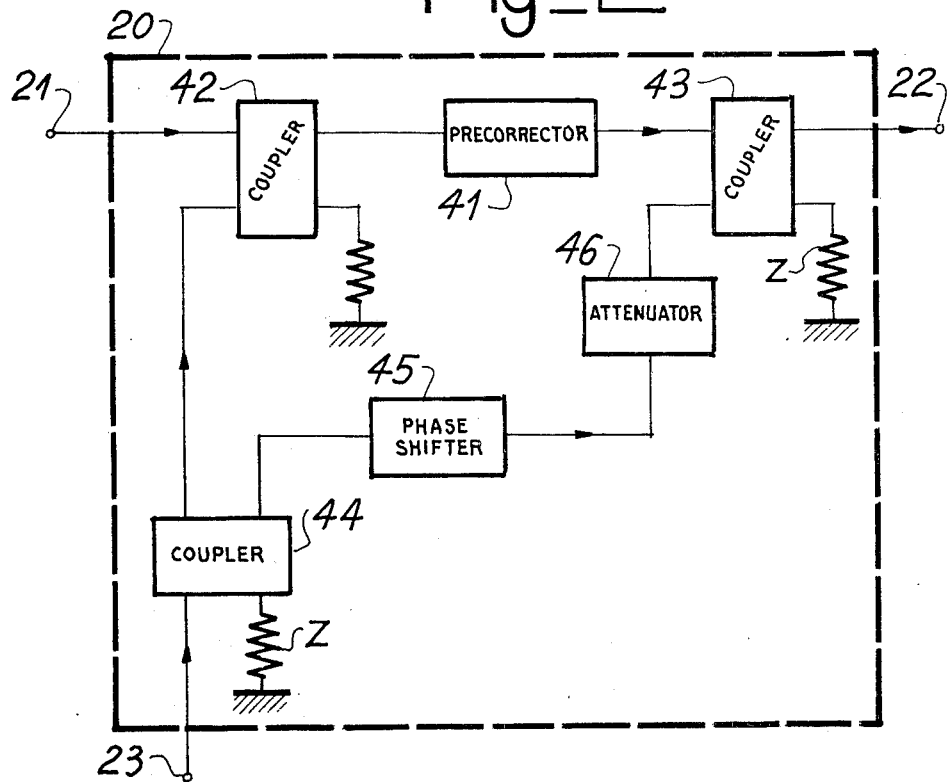
Fig_2
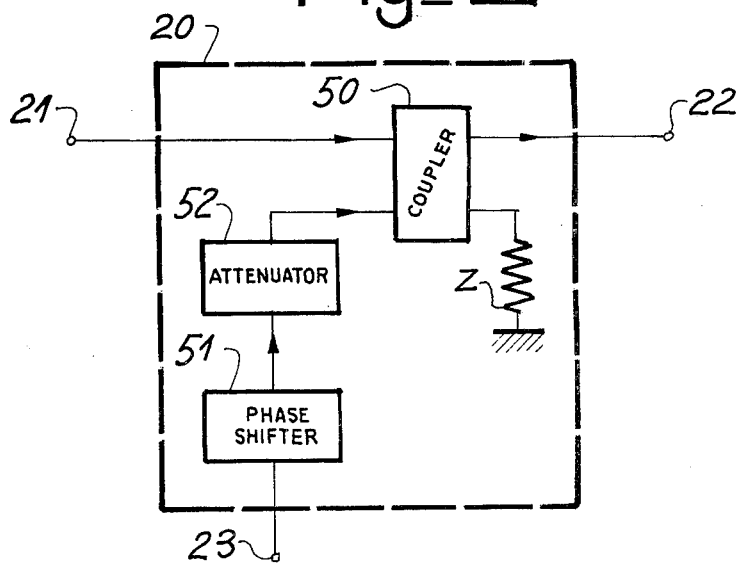
Fig_3

COMMON AMPLIFICATION SYSTEM FOR VIDEO AND AUDIO FREQUENCY SIGNALS

This invention relates to common amplification systems for video and audio frequency signals and, in particular, to single-channel television transmitters for the transmission of images and sound.

In known single-channel amplification systems for video and audio frequency signals, each of these two signals modulates a separate intermediate-frequency signal. The modulated signals are then added for application to a single conversion and power amplification channel at the final service frequency. A non-linearity precorrector is provided at the input end of this channel to correct the distortion introduced by the power amplifier stages which generate intermodulation products between the signals transmitted.

This correction is a delicate operation because it has to apply to all the amplifier stages, although the economic advantage of using a single-channel lies essentially in the common use of the single power stage.

The object of the present invention is to obviate this disadvantage.

According to the invention, there is provided a common amplification system for video and audio frequency signals, intended to feed a single-channel power amplifier having an input, said system comprising:
  first and second modulators, each respectively for modulating a separate intermediate-frequency signal by said video signal and said audio frequency signal, and having an output,
  coupling means having a main input coupled to said first modulator output, an auxiliary input and an output,
  first and second mixers each respectively having first and second inputs, and an output,
  a frequency generator having an output coupled in parallel to said second inputs of said first and second mixers,
  amplifying and coupling device having an output coupled to the input of said single-channel power amplifier and two inputs,
  said outputs of said first and second mixers being respectively coupled to said two device inputs,
  said output of said second modulator being coupled in parallel to said first input of said second mixer and to said auxiliary input of said coupling means, and said coupling means output being coupled to said first input of said first mixer.

The invention will be better understood and other characteristics thereof will become apparent from the following description in conjunction with the accompanying drawings, wherein:

FIG. 1 is a block diagram of an amplification system according to the invention.

FIGS. 2 and 3 are variants of part of the arrangement shown in FIG. 1.

In FIG. 1, a terminal 1 receives the video frequency signals applied to a modulator 2 also fed by a first intermediate-frequency signal supplied by a generator 3. The modulated signals thus obtained feed the input terminal 21 of a coupling means 20 through a band pass filter 5 and a rejecting filter 6 connected in series.

In addition, a terminal 8 receives the audio frequency signals applied to a modulator 9 also fed by a second intermediate-frequency signal supplied by a generator 10. The modulated signals thus obtained feed a mixer 11 through a coupler 12 of which the second output feeds an auxiliary input 23 of coupling means 20 the output terminal 22 of which is connected to a mixer 13 through an optional corrector 7 shown in dotted lines. A generator 14 supplies a conversion signal to the mixers 11 and 13. The converted output signals of the mixer 11 feed a first input of a diplexer 15 through a band pass filter 16, an adjustable phase shifter 31 and an amplifier 17 connected in series. The output of the mixer 13 is connected to a second input of the diplexer 15 through a band pass filter 18 and an amplifier 19 connected in series. The input of a final power stage 32 is connected to the output of the diplexer 15, its output being combined with that of the amplification system into a single terminal 33.

In a structure such as this and up to the inputs of the diplexer 15, the image and sound signals follow an independent path essentially comprising the modulation of a separate intermediate frequency by each of the signals, followed by a similarly separate preamplification of the modulated signals after conversion to their respective final service carrier frequencies. The interesting properties of this arrangement in regard to correction of the non-linearity distortion of the amplifier 32 will be explained after the description of one of the two preferred variants of the embodiment of coupling means 20.

In FIG. 2, the coupling means 20 comprises a precorrector 41 which receives the signals applied to a main input 21 of the coupling means through two ports of a first hybrid coupler 42 and delivers them to the output 22 of the coupling means through two ports of a second hybrid coupler 43. The signals present at the secondary input 23 of the coupling means are applied to a first port of a third hybrid coupler 44 which distributes them at its second and third ports respectively coupled to a third port of the coupler 42 (directly) and to a third port of the coupler 43 through a phase shifter 45 and an attenuator 46, both adjustable and connected in series. The fourth ports of each of these three couplers are connected to a load impedance Z having the same value as their characteristic impedance which is assumed here to be identical.

Accordingly, the intermediate-frequency signals modulated by the sound signal are, on the one hand, added to those modulated by the video signal in the coupler 42 before being applied to the precorrector 41, and on the other hand subtracted from the output signals of that corrector in the coupler 43, suitable adjustment of the attenuator 46 and the phase shifter 45 enabling the coupler 43 to function as a subtractor, the corresponding signals being dissipated into the load impedance Z of that coupler and the intermediate frequency signals modulated by the video signal being the only signals to be restored at the output terminal 22 apart from the components introduced by the precorrector 41. The precorrector 41 has an amplitude-amplitude response curve which is complementary to that of the final amplifier 32. It will be formed for example by at least one amplifier of variable threshold and gain, the approximation of the ideal curve being better, the greater the number of amplifiers with separate thresholds and gains provided and connected in parallel. The relative level of the signals added in the coupler 42 will be so adjusted as to be identical with that present in the amplifier 32 so that the precorrector 41 and the amplifier 32 are traversed by an identical frequency spectrum (allowing for conversion) which is an essential requirement for effective correction of non-linearity.

The function of the phase shifter 31 is to effect the best possible adjustment of the relative phase of the sound and image spectrums.

The diplexer 15 is materialised in passive form in one preferred embodiment, by a directional coupler which is fed by the video signal in its direct channel and by the sound signal in its attenuated channel. Satisfactory decoupling is obtained by an attenuation of the order of 8 dB which is readily tolerated in a frequency-modulated sound carrier at this power level (before final amplification).

In the frequent case where the final amplifier 32 is of the tube type whilst the amplifiers 17 and 19 are of the transistorised type, experience has shown that the response characteristics are substantially complementary and that this may be utilised to simplify the coupling means 20 in one version which is described hereinafter.

In FIG. 3, the coupling means 20 comprises a single hybrid coupler 50 which adds to the signal transmitted between its input 21 and output 22, through two first ports of the coupler 50, a fraction of the intermediate-frequency signal, which is modulated by the sound signal, applied to the secondary input 23 and which is transmitted to a third port of the coupler 50 through a phase shifter 51 and an attenuator 52 in order to adjust the phase and the level of this reinjection to obtain an intermodulation in the amplifier 19 which compensates that produced in the amplifier 32 because their characteristic curves are assumed to be complementary.

In either version of the coupling means 20, there is thus obtained an amplification system completely dissociated from the video and audio frequency signals, which enables the corresponding amplifiers to be operated at a high level and hence at high output, distortion products which are localised and readily correctable by means of the described systems being created solely at the power amplification level.

Due to the high-level amplification obtained, particularly in the wide-band amplifier 18, it may be necessary to arrange a linearity precorrector, such as 7, ahead of this amplifier. Where a controller of the type shown in FIG. 3 is used, this precorrector may be provided to improve the compensation of the characteristic curves between the amplifiers 18 and 32.

What we claim, is:

1. A common amplification system for video and audio frequency signals, intended to feed a single-channel power amplifier having an input, said system comprising:
    first and second modulators, each respectively for modulating a separate intermediate-frequency signal by said video signal and said audio frequency signal, and having an output,
    coupling means having a main input coupled to said first modulator output, an auxiliary input and an output,
    first and second mixers each respectively having first and second inputs, and an output,
    a frequency generator having an output coupled in parallel to said second inputs of said first and second mixers,
    amplifying and coupling device having an output coupled to the input of said single-channel power amplifier and two inputs,
    said outputs of said first and second mixers being respectively coupled to said two device inputs,
    said output of said second modulator being coupled in parallel to said first input of said second mixer and to said auxiliary input of said coupling means, and said coupling means output being coupled to said first input of said first mixer.

2. The system of claim 1 wherein said coupling means comprises:
    a distributor circuit having an input and first and second outputs,
    an adder circuit and a substractor device each respectively having an output and first and second inputs,
    an amplitude linearity precorrector, an adjustable phase shifter and an adjustable attenuator,
    said first output of said distributor being coupled to said second input of said adder, said second output of said distributor being coupled to said second input of said substractor device through said phase shift and said attenuator connected in series, and said distributor output being coupled to said first input of said substractor device through said precorrector,
    said distributor input, said first input of said adder and said substractor device output being respectively coupled to said auxiliary input, said main input and said output of said coupling means.

3. The system of claim 1 wherein said coupling means comprises an adder circuit having:
    a first input and an output respectively coupled to said main input and said output of said coupling means,
    and a second input coupled to said auxiliary input of said coupling means through an adjustable phases shifter and an adjustable attenuator connected in series.

4. The system of claim 1 wherein said device comprises:
    two amplifiers each having an input respectively coupled to said device inputs and an output,
    a diplexer having two inputs, and an output coupled to said device output, said two inputs of said diplexer being respectively coupled to said outputs of said two amplifiers.

5. The system of claim 4 wherein said diplexer is a directional coupler and wherein one of said amplifier input is coupled to said device input through an adjustable phase shifter.

6. The system of claim 1 wherein said coupling means output is coupled to said first input of said first mixer through a linearity corrector.

* * * * *